April 5, 1938.   G. H. SMITH   2,113,389
APPARATUS FOR MEASURING THE STIFFNESS OF FLEXIBLE MATERIALS
Filed May 31, 1932   4 Sheets-Sheet 1
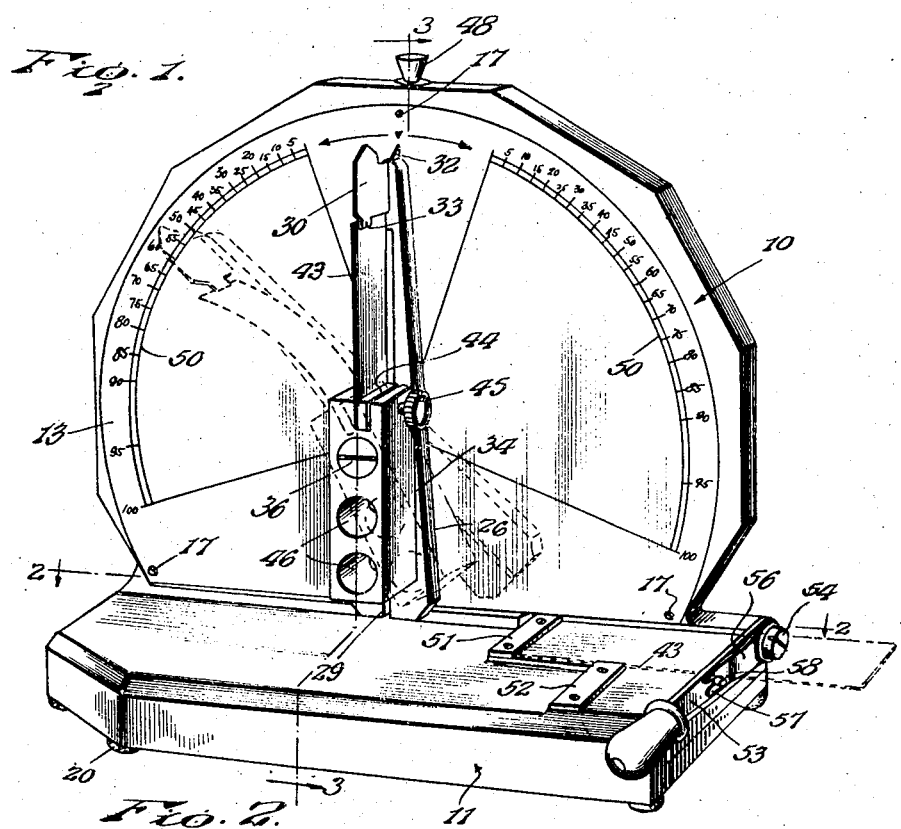
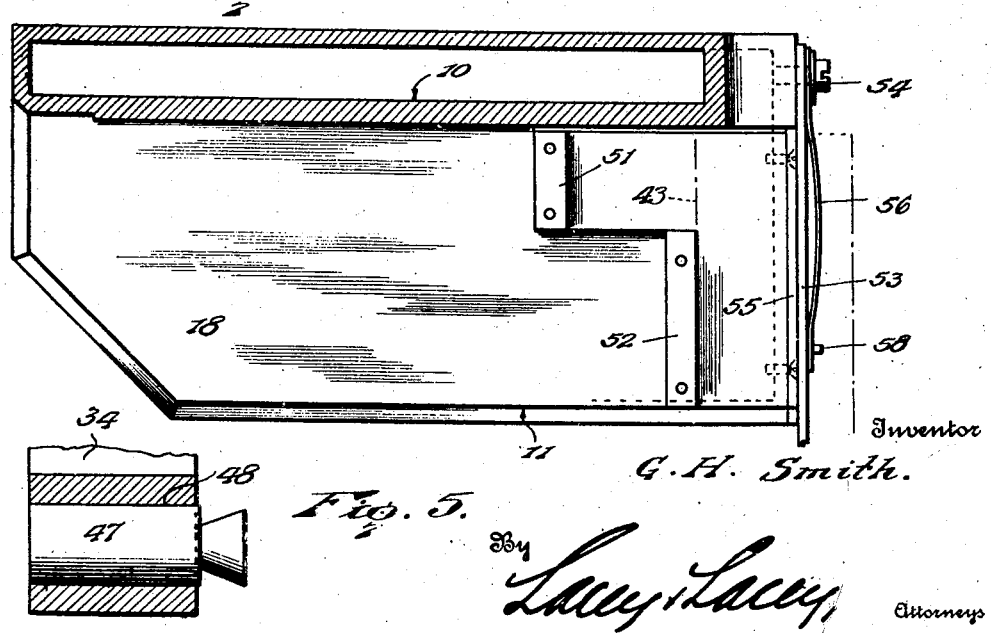

April 5, 1938.　　　　G. H. SMITH　　　　2,113,389
APPARATUS FOR MEASURING THE STIFFNESS OF FLEXIBLE MATERIALS
Filed May 31, 1932　　　4 Sheets-Sheet 2
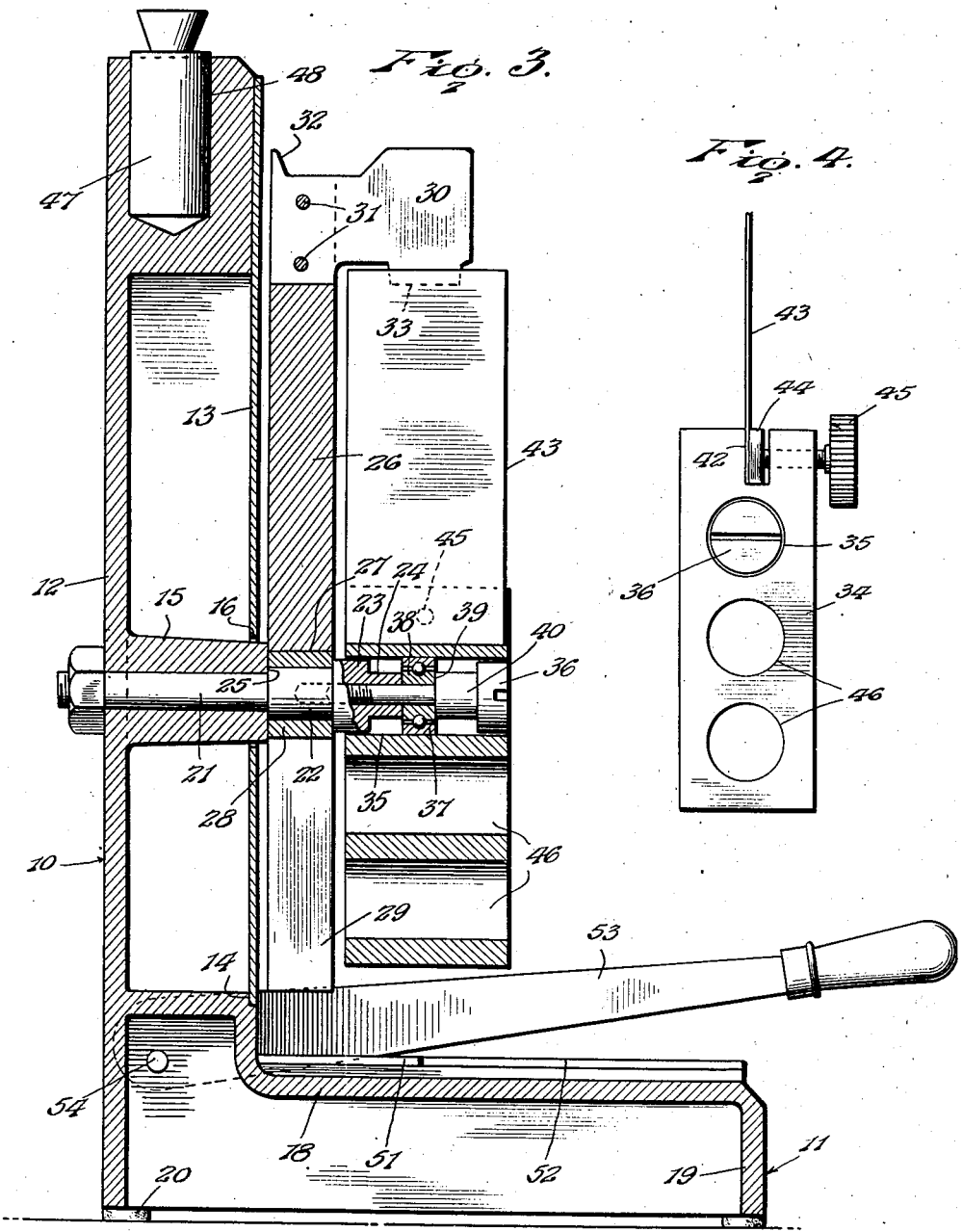
Inventor
G. H. Smith.
By Lacey & Lacey,
Attorneys April 5, 1938.  G. H. SMITH  2,113,389
APPARATUS FOR MEASURING THE STIFFNESS OF FLEXIBLE MATERIALS
Filed May 31, 1932  4 Sheets-Sheet 3
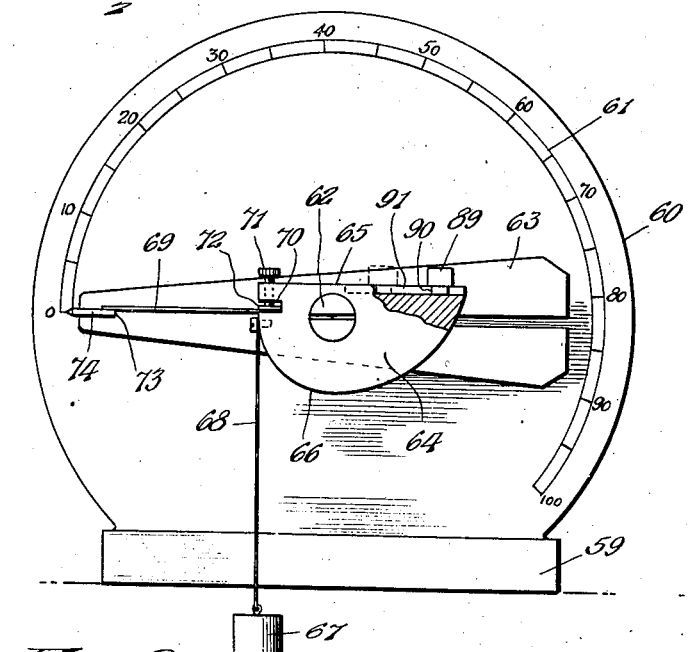
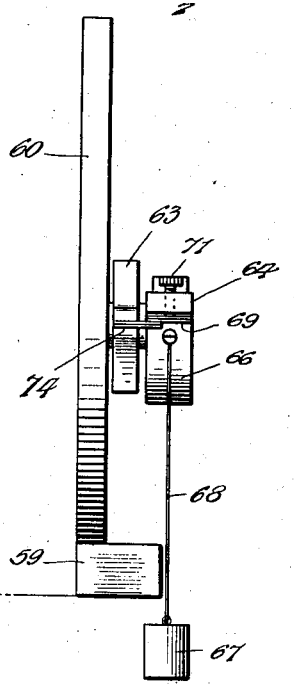
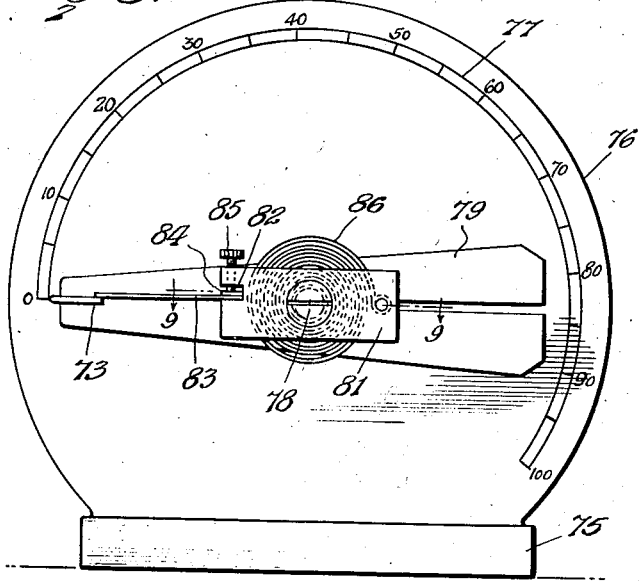
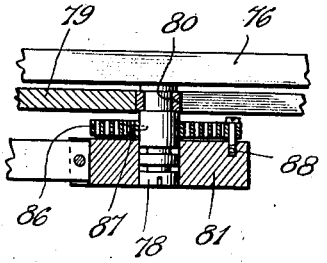
Inventor
G. H. Smith.
By Lacey & Lacey, Attorneys April 5, 1938.  G. H. SMITH  2,113,389
APPARATUS FOR MEASURING THE STIFFNESS OF FLEXIBLE MATERIALS
Filed May 31, 1932   4 Sheets-Sheet 4
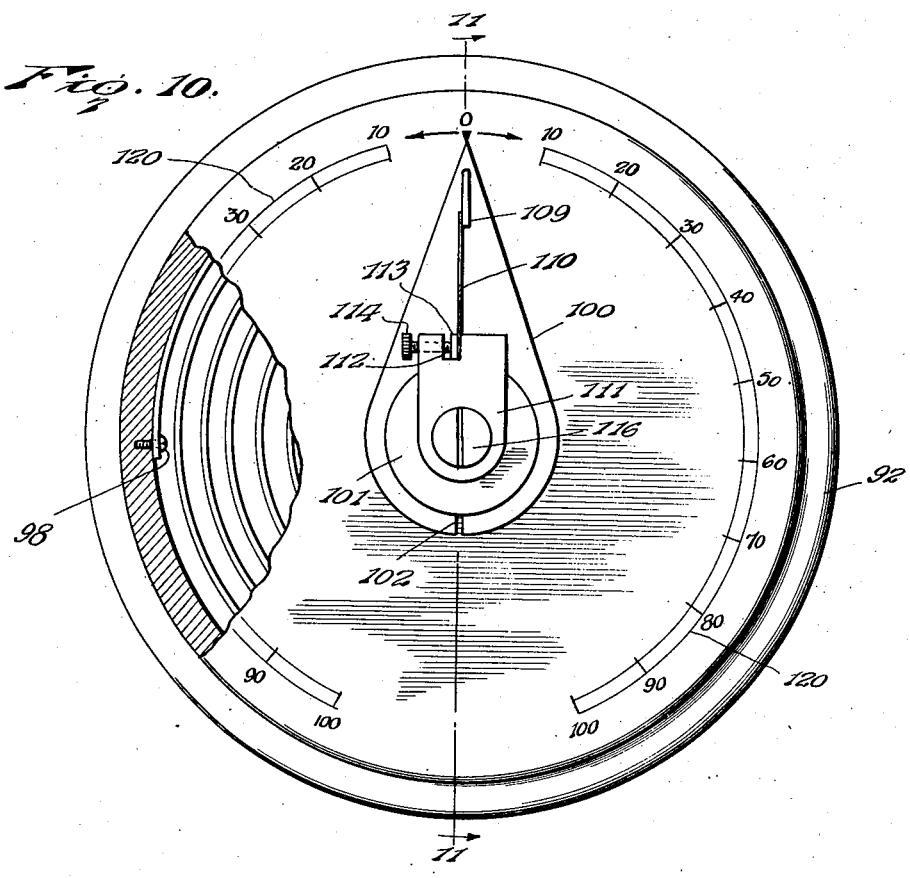
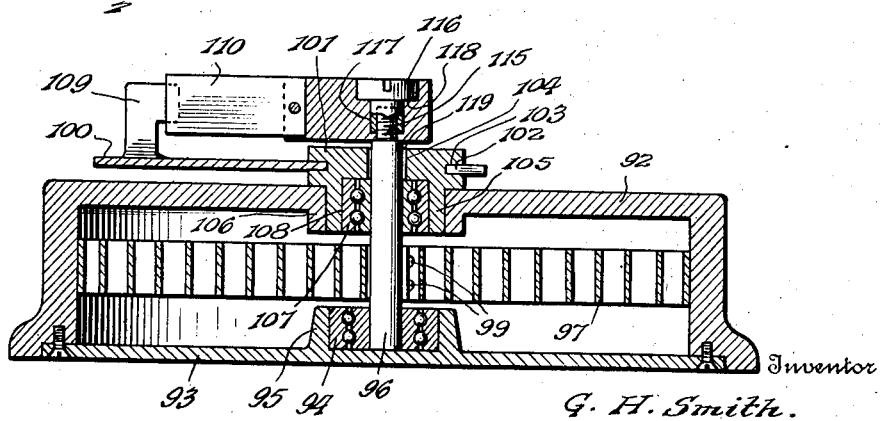
Inventor
G. H. Smith.
By Lacey & Lacey,
Attorneys Patented Apr. 5, 1938

2,113,389

UNITED STATES PATENT OFFICE 2,113,389

APPARATUS FOR MEASURING THE STIFF-NESS OF FLEXIBLE MATERIALS

George H. Smith, Kenmore, N. Y., assignor to Ralph F. Taber, North Tonawanda, N. Y.

Application May 31, 1932, Serial No. 614,517

7 Claims. (Cl. 265—17)

This invention relates to apparatus for measuring the stiffness of flexible materials.

The invention comprehends the provision of an instrument for measuring the stiffness of different materials such as paper, cloth, threads, wires and sheet metal, by bending or flexing a strip of given size through a given angle or a given amount and the force required to produce the given flexure is indicated as an index of the stiffness.

An object of the invention is to provide in such apparatus, a holder for the test strip, a pointer operatively associated with the holder, means for restricting relative movement of the pointer and holder, and scales reading to the right and to the left of the normal or rectilinear position of the test strip, whereby the test strip may be bent first to the right and then to the left and readings taken when the strip is deflected to its limit in each direction, so that an average may be computed from the aggregate scale readings to accurately determine the stiffness index of the material.

A further object is to provide apparatus including a pivoted pointer adapted to engage one end of the test strip, a yieldable holder for clamping the opposite end of the test strip, the pointer being manually movable across the scale to the position where the test strip disengages from the pointer and snaps back to the rectilinear, and means for retaining the pointer deflected at such point so that the scale reading may be readily observed.

A further object is to provide means for increasing the range of the instrument according to the type of material to be tested.

A further object is to provide a cutter by means of which the test strips may be cut to a predetermined exact length and width.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawings forming part of this specification,

Figure 1 is a perspective view of one form of the apparatus,

Figure 2 is a cross section taken on the line 2—2 of Figure 1,

Figure 3 is a vertical central section of the apparatus.

Figure 4 is a detail front elevation of the pendulum,

Figure 5 is a detail section showing the method of increasing the range of the instrument, Figure 6 is a front elevation of a modified form of the invention, Figure 7 is an end elevation of the instrument shown in Figure 6, Figure 8 is a front elevation of another modified form of the invention, Figure 9 is a detail cross section taken on the line 9—9 of Figure 8, Figure 10 is a plan view of another modified form of the invention, and, Figure 11 is a cross section taken on the line 11—11 of Figure 10.

In order to measure the stiffness of materials it is desirable but not necessary to arrange a test strip in vertical position and to take account of the weight of the strip, making compensation for the amount of bending or flexing caused by its own weight. It is further desirable to limit the flexing of the strip to an amount less than the elastic limit of the material being tested as stiffness cannot be measured at or beyond the elastic limit in view of the difference between the quality of a material which imparts stiffness as compared with its elastic qualities. The invention is therefore adapted to register the stiffness of materials when flexed a limited and fixed amount by a known force with a given size of strip for testing. The term "strip" as herein used is to be interpreted to mean a test strip of given length and width as well as a thread, wire or other piece of material of a given size capable of being tested.

It is well known that paper, for instance, is stiffer on one side than on the other, that is, it may exhibit greater stiffness when bent to the right than when bent to the left, or vice versa. This is attributed to the greater density of fibers on the "wire side" of the paper sheet. To obtain the accurate stiffness index of paper, the present tester is provided with spaced scales having their origins adjacent to the normal, vertical or unstressed position of the test strip so that the test strip may be bent either toward or away from the "wire side" without removing the test strip from the holder by simply reversing the direction of movement of the pointer, and thereupon the aggregate readings of both scales may be averaged to obtain the stiffness index.

Referring now to the drawings in which like characters of reference designate similar parts in the various views, 10 designates a frame and 11 a base from which the frame extends perpendicularly, both these parts preferably being formed of metal cast in one piece, or may be formed of other materials and assembled as desired. Preferably the frame is closed at the back by a back plate 12, as shown in Figure 3, and is closed at the front by a dial 13, the base edge of the frame being substantially straight and provided with a recess 14 to receive the bottom straight edge portion of the dial. The back plate 12 is provided with a hub 15 which extends through an opening 16 in the dial. Preferably the frame is arched in a general way in contour, as best shown in Figure 1, and the dial may be removably secured thereto by screws 17.

The base, as best shown in Figure 3, comprises a flat table top 18 having a marginal flange 19 extending therearound and supporting the apparatus level upon a desk, table, or other suitable support and preferably felt or similar buttons 20 are arranged at the corners of the flange to prevent marring of the furniture.

Referring again to Figure 3 it will be seen that a shaft 21 is mounted in the hub 15. The shaft is uniformly enlarged at the outer end to provide a bearing 22. Beyond the bearing, the shaft is again enlarged to provide a head 23 and beyond the head the shaft is uniformly reduced to provide an abutment 24. The shaft is secured in place by means of a nut which engages the back plate 12 and coacts with a shoulder 25 on the bearing 22, which engages the front end of the hub 15, to hold the shaft against rotation in the hub.

A pointer 26 is provided centrally with an opening 27 which is equipped with a fiber bushing 28 to frictionally fit the bearing 22. Below the bushing the pointer is split, as shown at 29. The bushing is preferably split so as to be contracted and driven snugly into the opening 27 and it will be seen that the head 23 of the shaft engages the front edge of the bushing and holds the rear edge of the bushing against the front end of the hub 15 to removably mount the pointer on the shaft.

The top of the pointer is slotted to receive a plate 30 which extends forwardly at a right angle to the pointer and forms a grip which may be grasped by the thumb and forefinger of the operator's hand to swing the pointer on the shaft either to the right or to the left. The plate is secured to the pointer by means of spaced rivets 31 or otherwise. The plate projects beyond the pointer at the rear edge and terminates in a finger 32 which constitutes the tip of the pointer. The bottom edge of the plate beyond the pointer 26 is extended downwardly to provide a stop lug 33. When the pointer is swung to the right or to the left on the bearing 22, by virtue of the bushing 28 engaging the bearing 22 with considerable friction, the pointer will remain at its limit of movement in either direction.

The pendulum 34 is substantially rectangular both in longitudinal and cross section and is provided near the top with a mounting opening 35. To mount the pendulum a screw 36 is threaded into the end of the shaft 21. The screw is provided intermediate the ends with a standard ball bearing assembly, the outer race 37 of which is press fitted into the mounting opening 35 of the pendulum, while the inner race 38 is removably clamped between the shoulder 39 of an enlarged neck 40 on the screw and the above mentioned abutment 24 on the end of the shaft 21.

The pendulum is provided with a slot 42 in the top to receive the lower end of the test strip 43.

A clamp strip 44 is mounted in the slot and is urged by a set screw 45 to bind the lower end of the test strip snugly against the inner wall of the slot, as shown best in Figure 4.

Below the mounting opening 35 of the pendulum a pair of openings 46 are formed in the pendulum to selectively receive a cylindrical weight 47 which will be hereinafter referred to as a multi-range weight. This weight is ordinarily carried in a socket 48 formed in the top of the frame 10 and is for the purpose of multiplying the effective weight of the pendulum and increasing the range of the instrument, as will hereinafter be described in detail.

By referring now to Figure 1, it will be seen that the specimen strip 49 to be tested is inserted at the bottom in the holder of the pendulum and the set screw 45 tightened. The strip is of sufficient length to extend slightly beyond the stop lug 33 of the pointer and lodge thereagainst so that when the grip 30 is moved slowly across the dial the test strip will be deflected from the vertical and bent to the right or to the left according to the direction of movement of the pointer. Each side of the dial to the right and left of the vertical axis thereof is provided with a scale 50, both scales being counterparts of each other and calibrated in any desired units.

When the pointer is moved slowly across the scale to the position where the strip snaps back to vertical the scale is read at that point. Then the strip is bent in the reverse direction in the same manner and the reading on the opposite scale noted. The average of the right and left scale readings is the stiffness index of the specimen. When the strip snaps past the stop lug it has been flexed to a given extent and the scale reading at the point of the snapping of the strip past the stop lug therefore registers the stiffness of the material. This applies to each of the forms of the invention disclosed.

Preferably the test strips are cut to exact length and width, say for instance, 1.5" by 3.5". For this purpose a pair of guide strips 51 and 52 are secured to the flat top 18 of the base, as best shown in Figures 1 and 2. A knife 53 is pivoted at the rear end on a pivot pin 54 secured to the frame 10, as best shown in Figure 3 and is held against a shear strip 55, best shown in Figure 2, by means of a flat leaf spring 56 held in place at the rear end by the pivot pin 54 and having the free end forked, as shown at 57 in Figure 1, to receive a lateral pin 58 carried by the knife. The test strip may be cut to the exact width by being passed from the front toward the rear of the base against the guide strip 52, as shown in Figure 2. The test strip may be cut to the exact length by being inserted endwise underneath the knife on the table top until it engages the guide strip 51, as shown in Figure 1.

The multi-range weight 47 is inserted in one of the openings 46 in the pendulum to multiply the effective weight of the pendulum. The range factor is stamped on the head of the weight and the scale reading is multiplied by this number. For instance, if the reading is 47 on the scale and a weight having a factor of two stamped on its head is used, then the stiffness is twice 47 or 94. In all cases where a double, right and left, scale instrument is used, test specimens are bent both ways and the average of the right and left scale represents the stiffness of the specimen. Thus a strip test, for example, may be as follows. Left scale reading 47×2 (weight factor) equals ninety-four, right scale reading 42×2 (weight factor)

equals eighty-four, total one hundred seventy-eight. One hundred seventy-eight divided by two is eighty-nine which is the stiffness index of the specimen.

With the construction of the invention as illustrated in Fig. 1 for example, the flexing of the test strip by movement of the pointer relative to the pendulum with the fixed distance between stop lug 33 and slot 42 in the pendulum, together with the fixed length of the test strip secures a limiting of the flexing of the test strip to an angle of approximately twenty-two and one-half degrees. At this limit of flexing the end of the test strip will snap past stop lug 33 so that this snap action prevents flexing of the test strip beyond a given angle or given amount that is predetermined so that all test specimens are flexed the same given amount in testing in order that the scale readings may be subsequently compared. Therefore, reference made herein and in the claims to means limiting the flexing of the test strip to a given amount shall be interpreted to include the parts hereinabove described cooperating in the manner described so that the flexing of the test strip will not exceed the elastic limit as hereinbefore stated.

In the above described form of the invention the pointer bends the test strip until the pull of the pendulum causes the strip to snap past the stop plate. A modified form of the invention is shown in Figures 6 and 7 in which a weight and a cam lever is substituted for the pendulum, the cam lever being so shaped as to give a uniformly increasing pull to the weight which permits of the graduations on the scale being all the same distance apart in contrast to the pendulum design wherein the decreasing pull of the pendulum in proportion to the distance moved must be compensated for by increasing the size of the graduations.

Referring to Figure 6 it will be seen that upon a base 59 there is mounted an upright dial 60 having an arcuate scale 61 disposed thereon. Upon a pivot pin 62 there is mounted a pointer 63 which may be identical in construction with the pointer 26, above described in detail. Also mounted upon the pivot pin is a cam 64 having a flat side 65 and a curved cam surface 66 which gradually increases in radius from one end of the flat side to the opposite end of the flat side, as shown. A weight 67 is suspended from the cam by a cable 68 and serves to balance the assembled cam and pointer so that the pointer and the flat side of the cam normally extends horizontally.

The test strip 69 is clamped in a holder in the cam produced by slotting the cam surface, as shown at 70, to receive one end of the strip, a set screw 71 being urged against a clamp strip 72 in the slot to clamp the strip in the slot. The strip is of sufficient length to overlap stop projection 73 on the grip 74 of the pointer. As the pointer is moved slowly around the scale 61 by manual pressure against the grip 74 the cam exerts an increasing opposition to movement of the pointer until the test strip 69 snaps off the stop projection 73 and springs back to the rectilinear position. The pointer will remain deflected to its limit of movement and indicate on the scale the degree of rigidity of the particular specimen strip being tested.

Another modified form of the invention is shown in Figures 8 and 9 in which a helical spring is employed to retard movement of the test strip holder relative to the pointer instead of a pendulum or a cam and weight. The advantage of this form of the invention is extreme simplicity and a uniformly graduated dial, which latter may be equipped with a single or a double scale as desired.

Referring to Figure 8 it will be seen that upon a base 75 there is mounted a dial 76 which, in the embodiment shown, is provided with a single scale 77. A stationary pivot pin 78 projects from the front face of the dial 76. A pointer 79, similar to the pointers above described, is mounted to turn on the pivot pin and is friction retarded by a bushing 80 to remain at its limit of deflected movement, as also above described.

In this embodiment of the invention the strip holder 81 is substantially oblong in cross section and contour and is rotatably mounted on the pivot pin. The holder is equipped in one end with a slot 82 to receive the test strip 83, which latter is clamped in the slot by means of a clamp strip 84 urged against the test strip by means of a set screw 85. The test strip is of sufficient length to overlap the stop projection 73 of the pointer.

A coil spring 86 is mounted on the pivot pin between the pointer and the strip holder, one end of the spring being secured to the pivot pin by means of a pin 87, and the outer end being secured to the holder 81 opposite the slot 82 by means of a pin 88.

In operation the pointer is manually moved over the scale, as above described, to bend the strip. The spring exerts a gradually increasing pull on the holder so that eventually the test strip will snap past the stop projection 73 and return to the rectilinear, the pointer remaining at its limit of deflection so that the scale reading may be taken to determine the degree of rigidity of the test strip.

Various sizes of springs or dial combinations may be used in the modified form, shown in Figure 8, to vary the range of the instrument. In the modified form, shown in Figure 6, various weights 89 may be mounted on the flat face of the cam on the opposite side of the pivot pin from the weight 67 to obtain the same result. Such weights may be provided with a stem 90 which is slidably fitted in a groove 91 on the flat face of the cam to accommodate adjustment of the weight longitudinally of the cam toward and away from the pivot pin 62.

Another modified form of the invention is shown in Figures 10 and 11 in which the instrument is adapted to be laid flat on a desk or similar support and present its dial horizontally.

Referring now to Figure 10 it will be seen that a substantially circular base or casing 92 is closed at the bottom by a base plate 93 which is provided centrally with a ball bearing assembly 94 mounted in a cup 95 disposed centrally on the base plate. An upright pivot pin 96 is fixed at the bottom in the inner face of the ball bearing assembly and thus may turn on its axis. A coil spring 97 is secured at the outer end to the wall of the casing by means of a screw 98, and is secured at the inner end to the pivot pin by means of screws 99 so that the spring resists turning of the pivot pin on its axis.

A pointer 100, formed from a substantially triangular plate is provided with a circular opening to receive a collar 101, the plate being split, as shown at 102, to permit application thereof to an annular groove 103 formed in the collar. The collar loosely receives the pivot pin through an axial opening 104 and is provided with an annular neck 105 which frictionally engages in a flange 106 formed in the top of the casing 92 so that the pointer will be retarded in its movement by such frictional engagement. A ball bearing assembly 107 is mounted in the bore 108 of the annular neck 105 and encircles the pivot pin. The ball bearing assembly 107 permits of the pivot pin freely turning on its axis within the collar 101. The pointer is provided with an upstanding stop projection 109 for detachably engaging the test strip 110.

The holder for the test strip comprises a block 111 having a slot 112 to receive the test strip, a clamp strip 113 being urged by a set screw 114 to bind the test strip against the wall of the slot, as heretofore described. By referring to Figure 11 it will be seen that the pivot pin 96 is provided with a reduced threaded terminal 115. Upon this terminal the holder 111 is mounted by means of a screw 116 provided with an interiorly threaded shank 117 that receives the threaded terminal, a suitable opening 118 being formed in the holder to receive the head and shank of the screw. When the screw is tightened upon the terminal 115 the holder will be clamped against a shoulder 119 formed at the base of the terminal 115 and secured for movement as a unit with the pivot shaft 96.

The top surface of the casing 92 is preferably equipped with spaced scales 120 having their origins at the rectilinear position of the test strip, as best shown in Figure 10, so that in this form of the invention the test strip may be bent both to the right and to the left by corresponding movement of the pointer, the holder being, meanwhile, retarded in its movement by the spring 97, until the pull of the spring causes the test strip to snap past the stop projection 109 and return to the rectilinear, as above described. The pointer remains at its limit of deflected movement due to the frictional engagement between the annular neck 105 and flange 106 so that the scale readings may be taken and averaged to compute the stiffness index of the test strip.

In all forms of the invention above described, it will be observed that the pointer and holder are relatively movable, that the holder is retarded in movement relative to the pointer to exert increasing pull upon the test strip until it snaps off of the pointer, and that the pointer is frictionally retarded so as to remain at its limit of deflected movement whereby scale readings may be readily taken.

What is claimed is:

1. Apparatus for measuring the stiffness of a test strip of flexible material including, a holder adapted to clamp one end of the test strip, a pointer adapted to releasably engage the free end of the test strip, a common pivot for the holder and the pointer, a scale having its origin adjacent to the normal or unstressed position of the test strip, means for retarding movement of the holder relative to the pointer, said pointer being manually movable across the scale to bend the test strip until it snaps back to the normal or unstressed position, and means for holding the pointer in its deflected position after release of the strip so that the scale reading may be taken.

2. Apparatus for measuring the stiffness of a test strip of flexible material including, a movable holder adapted to clamp one end of a test strip, a pivoted pointer adapted to releasably engage the free end of the test strip, a dial provided with spaced scales graduated to the right and left respectively of the normal or unstressed position of the test strip, means for retarding movement of the holder relative to the pointer, said strip being adapted to be bent to the right and to the left in sequence by manual movement of the pointer over the scales until released by the pointer, and means for holding the pointer in its extreme deflected position so that readings may be taken when the strip is deflected to its limit in both directions.

3. Apparatus for measuring the stiffness of flexible material including, a pointer, a pendulum, a common pivot for the pointer and the pendulum, means carried by the pointer and frictionally engaging the pivot to maintain the pointer in adjusted positions of its arc of movement, a grip for moving the pointer having a projection adapted to overlap and releasably engage one end of the material, a holder on the pendulum above said pivot adapted to grip the other end of the material, a dial, and scales on the dial disposed laterally of the normal or unstressed position of the pendulum, the pointer being adapted to be moved manually across the scales by said grip to bend the material in sequence to the right and to the left until the material disengages from said projection at the end of each movement, said friction means holding said pointer stationary at the moment of disengagement of said material to permit the scale reading underneath the pointer being taken.

4. Apparatus for measuring the stiffness of a test strip of flexible material including, a pivoted pointer adapted to overlap and releasably engage one end of the test strip, a holder having terminal means for clamping the other end of the test strip, a cam and weight operatively connected to the holder and retarding movement of the holder relative to the pointer, movement of the pointer transmitting movement to the holder through the test strip, a scale positioned laterally of the normal or unstressed position of the test strip and having its origin at said position, and means for frictionally retarding movement of the pointer adapted to hold the pointer at deflected positions.

5. Apparatus for measuring the stiffness of a test strip of flexible material including, a pivoted pointer adapted to overlap and releasably engage one end of the test strip, a holder having terminal means for clamping the other end of the test strip, a common pivot for the pointer and the holder, a cam fixed to the holder, a weight suspended from the cam, said cam and weight exerting increasing pull on the holder during pivotal movement thereof, said pointer being manually pivoted and pivoting the holder through the instrumentality of the test strip whereby the test strip is bent from its normal or unstressed condition, and a scale having its origin at said normal or unstressed position of the strip and traversed by the pointer.

6. An apparatus for measuring the stiffness of a test strip of flexible material including, a pointer, a holder, a stationary pivot for the pointer and the holder, a grip for moving the pointer having a projection adapted to overlap and releasably engage one end of the test strip, a clamp on the holder for gripping the other end of the test strip, a spring secured at one end of the pivot pin and secured at the opposite end to the holder for retarding movement of the holder, and a scale positioned laterally of the normal or unstressed position of the test strip, the pointer being adapted to be moved manually across the scale by said grip to bend the test strip until the pull of the spring on the holder causes the test strip to snap past said projection and return to the normal or unstressed condition, the scale reading underneath the pointer at the deflected position of the pointer indicating the stiffness index of the test strip.

7. Apparatus for measuring the stiffness of a test strip of flexible material including, a pivoted pointer, a pivoted holder, said pointer and holder being relatively movable, means carried by the holder for clamping one end of the test strip, means carried by the pointer for releasably engaging the other end of the test strip, relative movement of the pointer and holder bending the test strip, means for retarding the holder to exert increasing pull upon the test strip until it snaps off of the pointer, means for frictionally holding the pointer at deflected positions, and a scale traversed by the pointer and having its origin at the normal or unstressed position of the test strip.

GEORGE H. SMITH.